US006848734B1

(12) United States Patent
Mulvaney

(10) Patent No.: US 6,848,734 B1
(45) Date of Patent: Feb. 1, 2005

(54) SEALING MECHANISM FOR TRUCK BOX COVER DEVICE

(76) Inventor: Tim Mulvaney, 2600 Demers Ave., Grand Forks, ND (US) 58201

( * ) Notice: Subject to any disclaimer, the term of this patent is extended or adjusted under 35 U.S.C. 154(b) by 0 days.

(21) Appl. No.: 10/444,727

(22) Filed: May 23, 2003

(51) Int. Cl.$^7$ .................................................. B60P 7/02
(52) U.S. Cl. ...................... 296/98; 296/100.03; 160/133
(58) Field of Search ............................ 296/98, 100.03, 296/100.17; 160/209, 133

(56) References Cited

U.S. PATENT DOCUMENTS

| 2,997,967 | A | * | 8/1961 | Malapert | 105/377.02 |
|---|---|---|---|---|---|
| 3,516,469 | A | * | 6/1970 | McDonald | 160/26 |
| 4,786,099 | A | * | 11/1988 | Mount | 296/98 |
| 4,889,381 | A | * | 12/1989 | Tamblyn et al. | 296/98 |
| 5,040,843 | A | * | 8/1991 | Russell et al. | 296/98 |
| 5,330,246 | A | * | 7/1994 | Bernardo | 296/98 |
| 2003/0230909 | A1 | * | 12/2003 | Melius et al. | 296/98 |

* cited by examiner

Primary Examiner—Patricia L. Engle
(74) Attorney, Agent, or Firm—Robert E. Kleve

(57) ABSTRACT

The invention includes a sealing mechanism device for sealing the front overhang for the cover of a roll type cover device for the truck box of a pick up truck when closing the cover over the truck box. The mechanism device has a cam structure on spiral ridges for caming the cover when closing the cover. The cams on the spiral ridges cooperate with rollers on the front edge of the cover to cam the front edge of the cover sharply up) against an overhang at the front of the truck box mechanism device to close the front edge of the cover flush to the overhang of the mechanism in substantially watertight relation to one another.

4 Claims, 5 Drawing Sheets

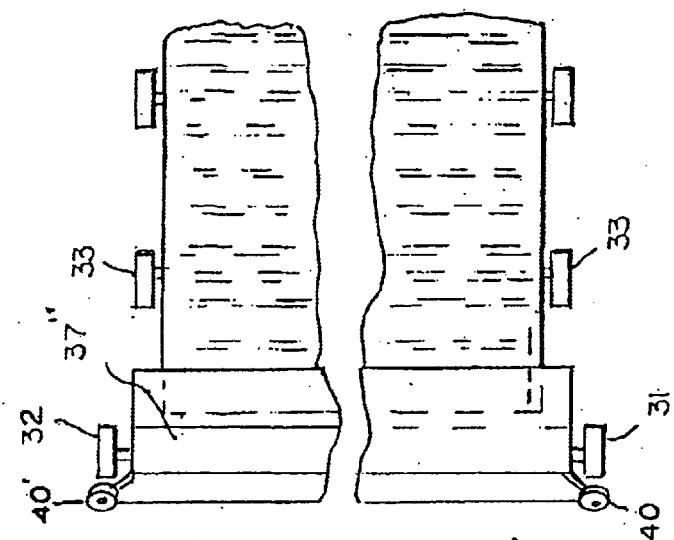
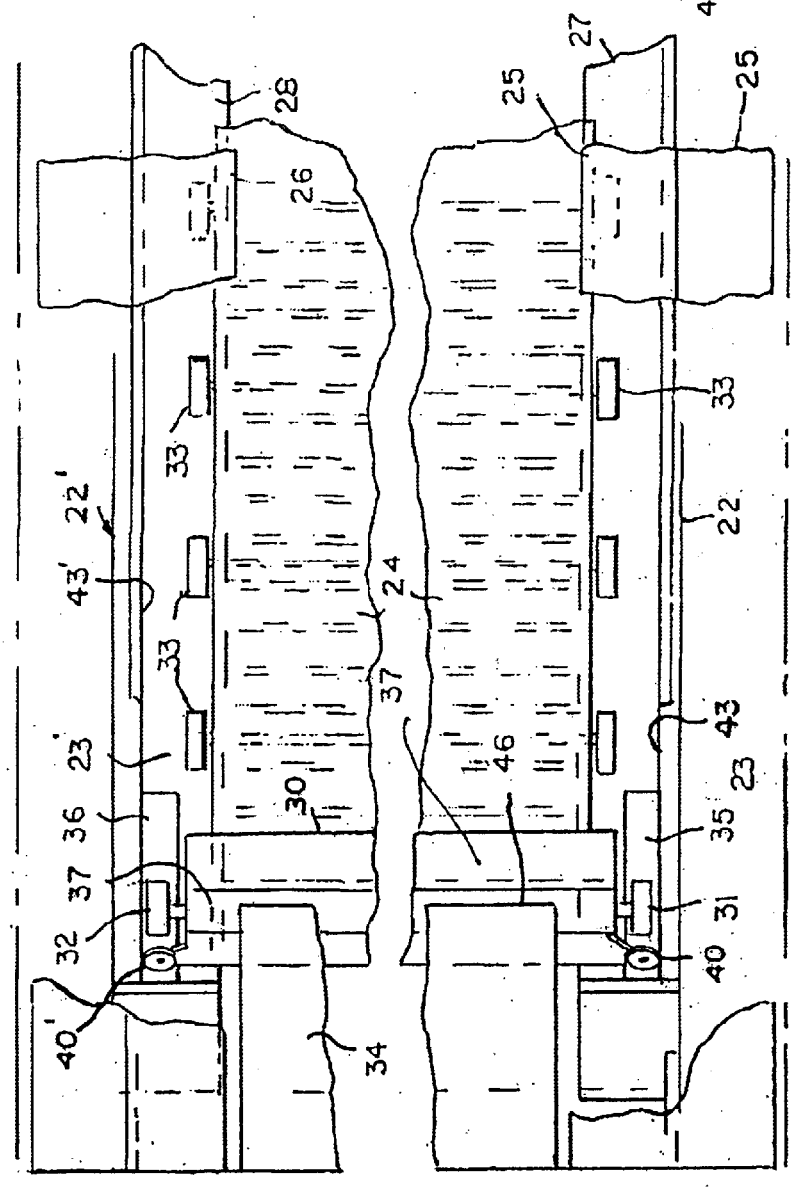

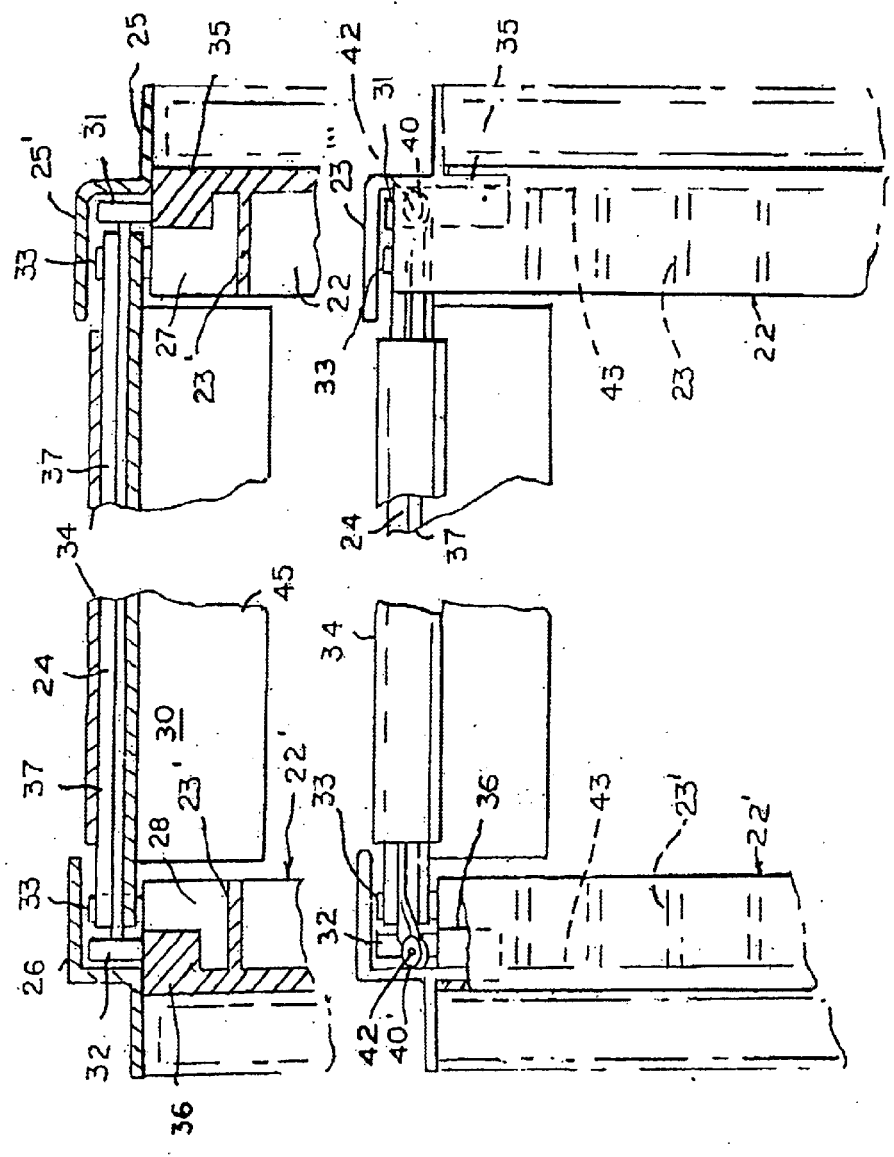
FIG. 7
FIG. 6
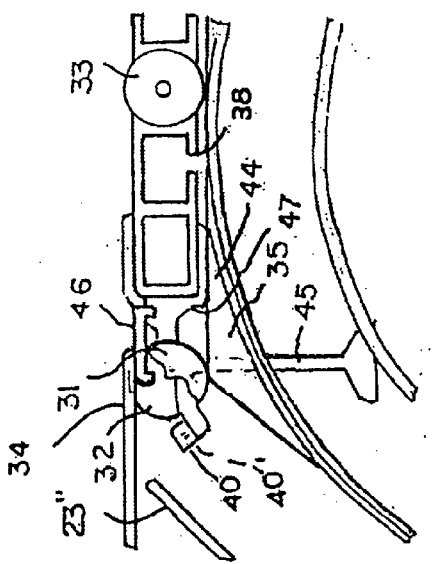
FIG. 8

SEALING MECHANISM FOR TRUCK BOX COVER DEVICE

This invention relates to truck box cover apparatus. More particularly, the invention relates to apparatus for sealing the truck box from the elements.

It is an object of the invention to provide a novel roll top storage truck box cover which rolls into storage and has straight rails for guiding the cover to cover the truck box with a cam mechanism to cam the forward end of the cover up against an overhanging flange on the top of a the device when covering the truck box.

It is another object of the invention to provide a novel mechanism for causing the forward edge of the cover to move into a flush sealed position with forward overhang portions of the device for sealing the cover to the overhang.

It is another object of the invention to provide a novel cam mechanism to cam the forward edge of the cover into a sealed position in parallel relation to a forward edge of the device.

Further objects and advantages of the invention will become apparent as the description proceeds and when taken in conjunction with the accompanying drawings wherein:

BRIEF DESCRIPTION OF THE DRAWINGS

FIG. 4 is a top view of the truck box cover device with the sealing mechanism illustrated.

FIG. 5 is a top view of the cover of the truck box device

FIG. 6 is a front end view of the truck box cover device with the cover closed over the truck box, FIG. 7 is a front cross sectional view of the truck box cover, taken along line 5—5 of FIG. 2.

FIG. 8 is an enlarged fragmentary cutaway side view of the cam structure.

BRIEF DESCRIPTION OF PREFERRED EMBODIMENT

Briefly stated, the invention comprises a sealing mechanism for sealing the forward front edge of the truck box cover to the forward front overhang of the device, when the cover fully covers the truck box, having a mechanism to cam the forward front edge of the cover upward flush against an overhanging flange on the box to seal the forward front edge of the cover flush to the fixed over hanging flange at the front of the truck box of the truck.

Figure 1:
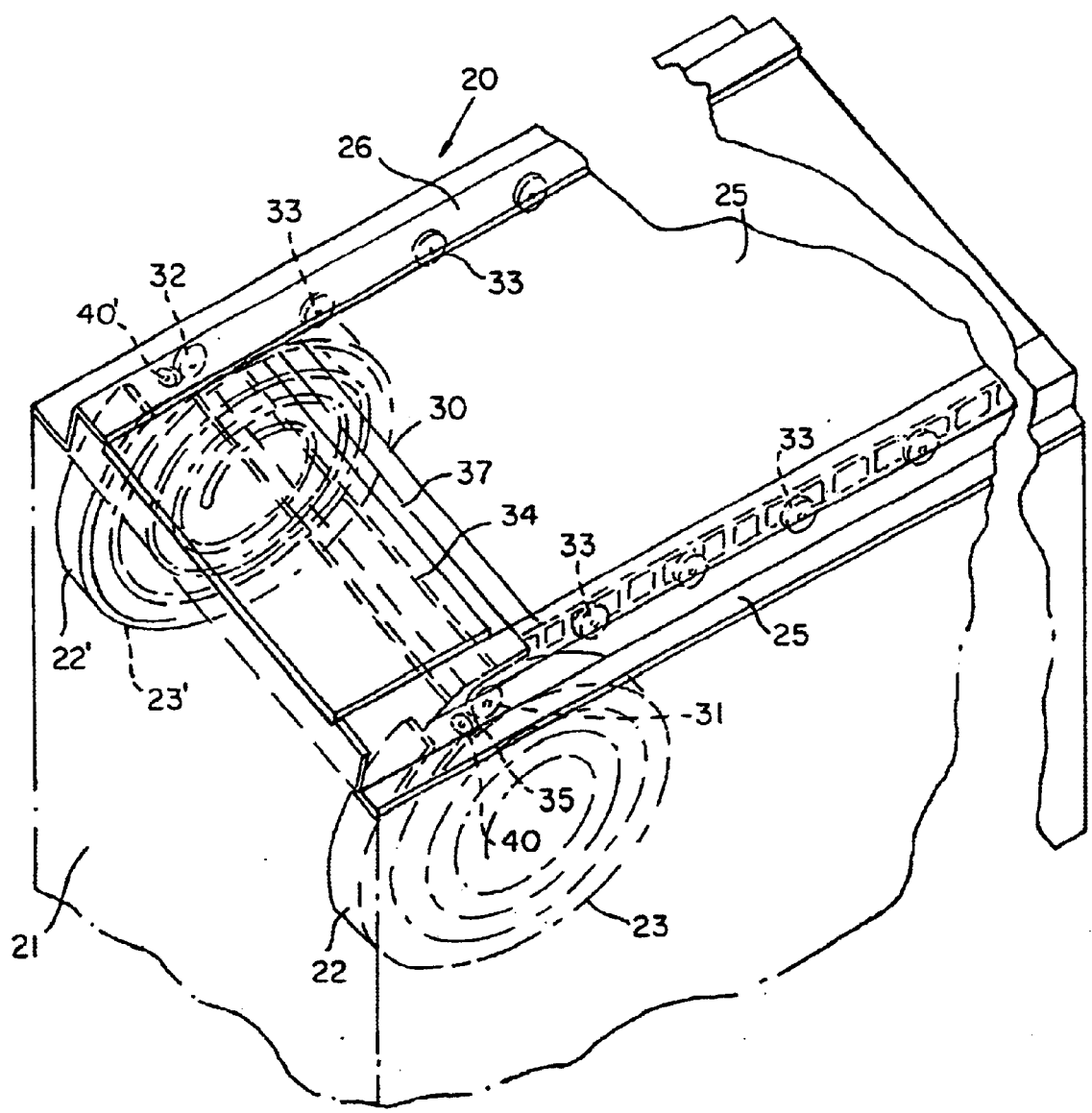
FIG. 1 is a perspective view of the truck box cover sealing device.
Figure 2:
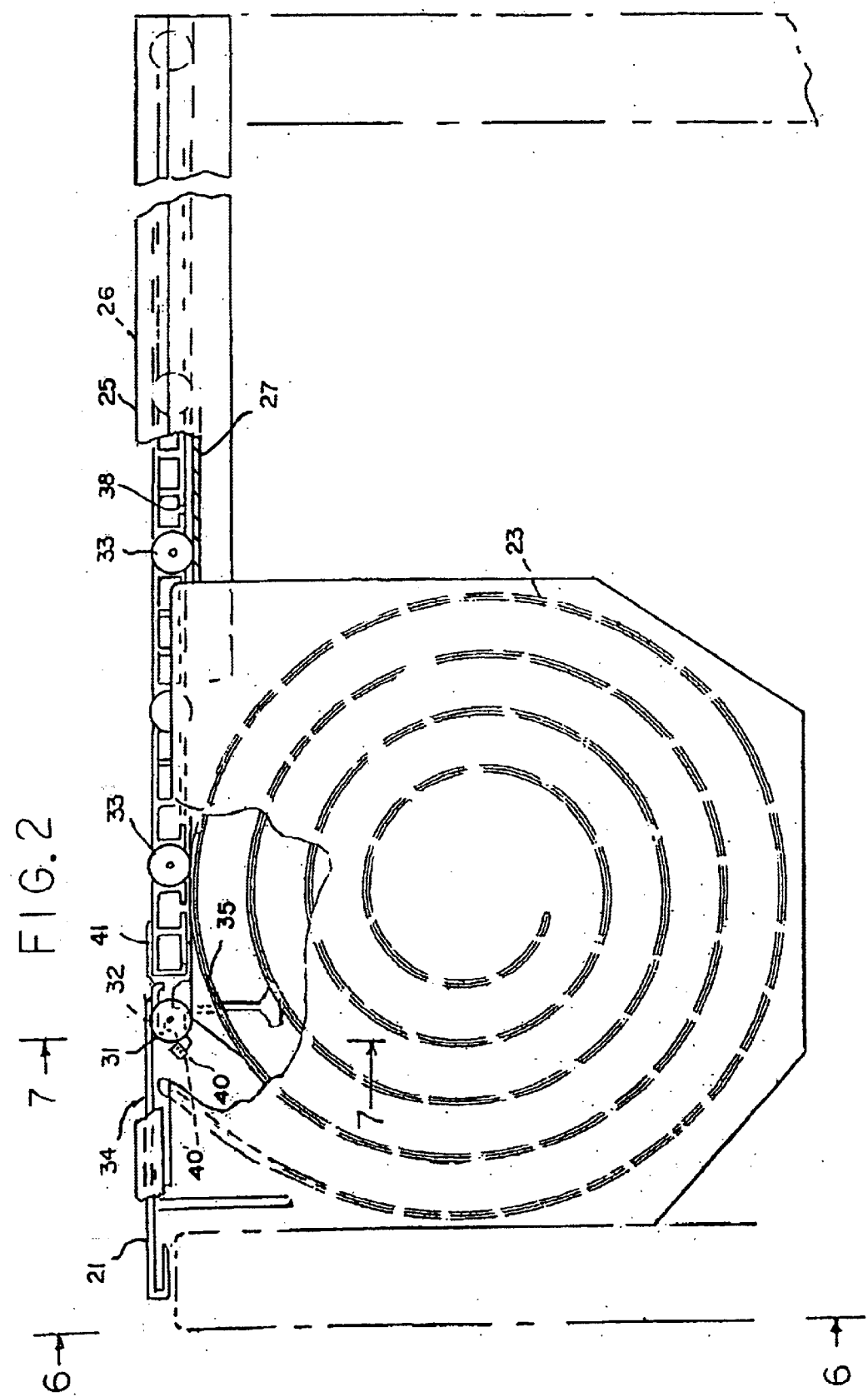
FIG. 2 is a side elevational view of the truck boy cover sealing device, with the cover fully closed over the truck box, with the forward end of the cover sealing against the underside or an overhanging flange on the forward edge of the device.

Referring more particularly to the drawings, in FIGS. 1 and 2, the truck box cover sealing apparatus 20 is illustrated mounted to the top of a truck box 21, shown in phantom lines. The apparatus 20 has a pair of spiral guide canister mechanisms 22 and 22' at the forward end of the truck box 21 The canisters have spiral ribs or ridges 23 and 23', respectively, positioned on the inside of each side of the truck box at the forward end of the truck box.

A pair of horizontal side strips 25 and 26 are provided along the top sides of the truck box. The straight strips extend in a straight line along the lateral sides of the truck box 21, rearward of the canisters, and have horizontal side rails 27 and 28.

A metal laterally extending front plate 30 is mounted to the forward end of the plastic cover 24. On the front plate 30 of the cover on opposite lateral sides of the plate are a pair of sealing rollers 31 and 32 rotatably mounted to the plate. The sealing rollers 31 and 32 ride upon the spiral ridges 23 and 23' of the canisters. The upper ends 23" of the spiral ridges terminate slightly above horizontal with the panel 24.

A plurality of support rollers 33 are rotatably mounted to the cover 24 on each side 24' and 24" of the truck box cover 24 and are rotatably mounted the cover at intermediate locations between the front and rear ends of the cover and rearward of the sealing rollers 31 and 32. The support rollers 33 on the intermediate portions of the cover also ride upon the lateral horizontal rails 27 and 28 on the top of the truck box when the cover 24 travels in a straight line forward and rearward across the top of the truck box, and also ride upon the spiral ridges 23 and 23' of the canister when rolling into and out of the spiral canisters. The spiral ridges 23 and 23' support and guide the rollers 31 and 32 and the support rollers 33 of the cover to guide the cover and rollers in a gradual spiral path and place the cover in a spiral shape when opening the cover 24 on the truck box.

At the front of the device is a fixed overhanging flange 34 fixed to the side rails 27 and 28 and extending above the canisters and adapted to rest on the top of the front wall of the truck box.

A pair of triangular cams 35 and 36 are fixed to a top portion 29 of each of the spiral ridges 23 and 23' of the canisters. The sealing rollers 31 and 32 on the opposite lateral front edge of the cover are aligned in the path of the spiral ridges 23 and 23' of the canisters to travel on the spiral ridges and travel in gradual spiral on the ridges during most of their travel. They are, however, further aligned in the path of the cams 35 and 36, so as to travel abruptly off the cams when initially opening the cover, and so as to travel abrupt back up onto the top 44 of the cams 35 and 36 when they reach the cams 35 and 36 when the cover is nearly closed and come to rest on the tops 44 of the cams when the cover is fully closed. The support rollers 33 are also aligned in the path of the spiral ridges 23, and 23' to travel on the spiral ridges, but are spaced inwardly on the spiral ridges, relative to the spacing of the rollers 31 and 32 so as not to be aligned in the path of the cams 35 and 36, so as to travel continuously in a gradual spiral on the spiral ridges past the cams without engaging the cams when opening or closing the cover.

Figure 3:
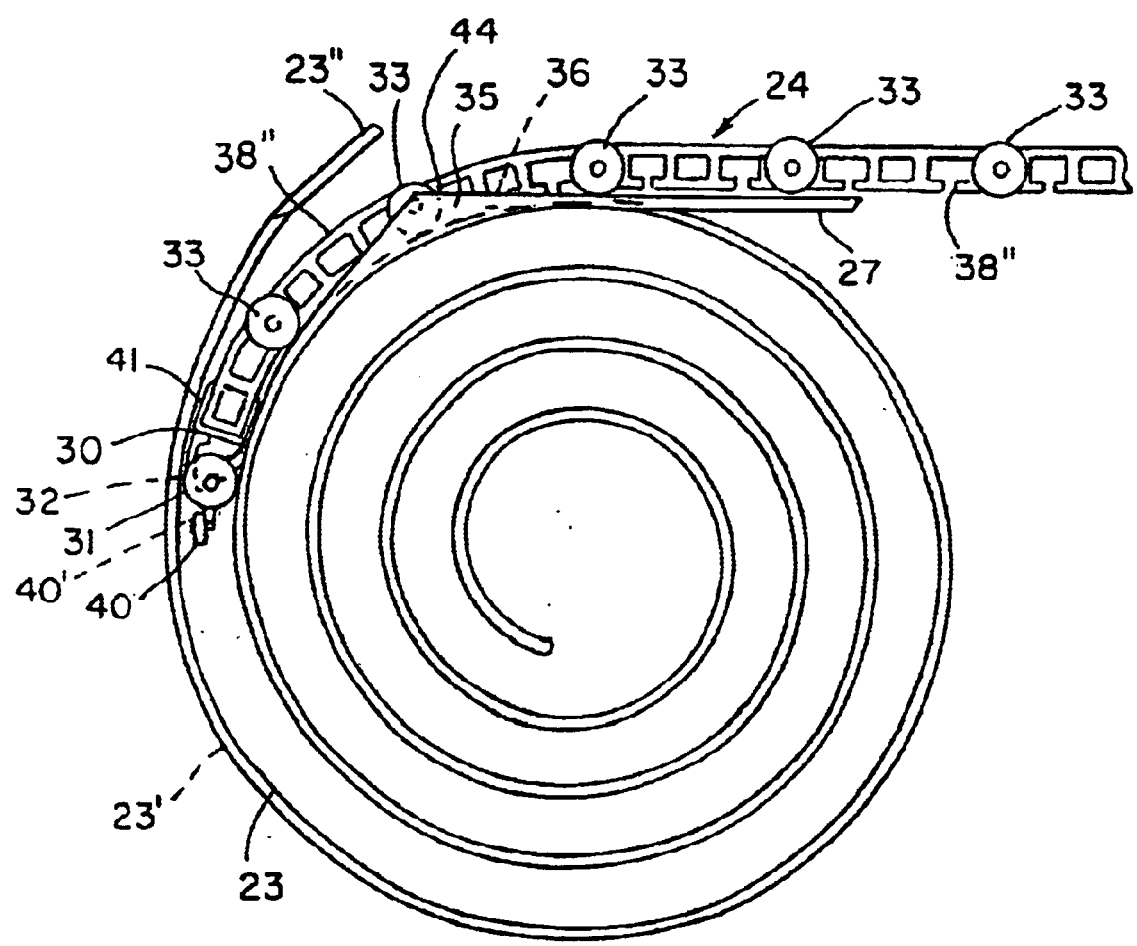
FIG. 3 is a side elevational view of the truck box cover device, similar to FIG. 2, illustrating the forward end of the truck box cover advanced forward and downward in a spiral a short distance into the spiral ridges of the canisters for storing the cover, when open.

When opening the cover 24 of the box, the cover will be slid down the spiral ridges, moving from right to left when viewed from FIG. 3. The initial opening of the cover will cause the sealing rollers 31 and 32 at the forward end of the cover to immediately and abruptly drop off the cams 35 and 36 allowing rolling space for the rollers with the rollers now rolling along the spiral ridges downward.

This immediate and abrupt dropping off the sealing rollers from the cams quickly opens the cover so that the front plate 30 can drop downward from the rear edge of the overhang to clear the rear edge of the overhang when opening the cover. The abrupt dropping of the front edge of cover is desirable to assure their clearing one another, as the rear edge 46 of the overhang is at the same height as the front plate 30 and they are closely adjacent one another when the cover is closed. The abrupt dropping further acts to prevent the cover from dragging along the underside of the overhang as the cover is opened. The upper ends 23" of the spiral ridges 23 and 23' are high enough to initially engage and guide the front plate 30 of the cover downward into the canister to further prevent dragging along the underside of the overhang.

The rest of the cover will follow and wind in gradual spiral fashion together with the support rollers 33 riding on the side straight rails 27 and 28 and spiraling down the spiral ridges past the cams, without engaging the cams 35 and 36, until the rear edge of the cover, not shown, of the truck box cover 24 reaches the overhanging flange 34 and the spiral mechanism, thereby fully opening the top of the truck box.

When closing the cover 24 over the truck box, the cover will be slid from left to right, when viewed from FIG. 1, with the cover unwinding, spiraling gradually out of the spiral canisters and sliding along the straight side rails 27 and 28 of the side strips 25 and 26, and with the sealing rollers 31 and 32 and supporting rollers 33 both riding on the spiral ridges 23 and 23' as the cover is initially unwound from the canisters, and with the supporting rollers 33 riding upon the inner portions of the spiral ridges beside and past the cams 35 and 36 at the top of the spiral ridges without engaging the cams 35 and 36, as shown in FIG. 3.

When the cover, in closing, reaches a point when the cover is nearly closed over the truck box; the sealing rollers 31 and 32 at the front of the cover, being aligned in the path of the cams 35 and 36 at the top 29 of the spiral ridges, will engage the cams 35 and 36 and the cams will cam the sealing rollers 31 and 32 and the front end of the cover 24 and cover plate 30 abruptly upward to move or shift the front end of the cover 24 and cover plate 30 abruptly upward on the cams 35 and 36 of the ridges 23 and 23', respectively, departing from its normal spiral winding and unwinding path to a position where the sealing rollers are on top 44 of the cams and a rubber panel 37 of the front panel 30 is flush parallel with and against the underside of the horizontal fixed projecting over hang flange 34 at the front of the device to thereby seal the front end of the cover to the overhanging flange to its position as shown in FIGS. 1 and 2. The cover will only move a short distance to the right on the cams to be fully closed. The sealing rollers will be resting on the tops of the cams when the cover is fully closed, as shown in FIG. 2.

The front overhanging flange 34 is adjacent the front of the truck box between the spiral canisters 22 and 22' and its front edge acts to cover the front top edge 45 of the truck box and its rear edge extends rearward a short distance from the edge 45 of the truck box when the device is mounted in the truck box.

The plate 30 at the front of the cover 24 has the rubber or resilient panel member 37 mounted the top of the front plate. The resilient panel 37 extends laterally the full width of the front edge of the cover 24 and its entire front width directly engages the underside of the rear end 34' of the overhanging flange 34 in flush relation to seal the entire front end of the cover to the overhanging flange in watertight relation, when the cover is slid fully rearward out of the canisters to fully cover the truck box, as shown in FIG. 1.

The plastic cover 24 is formed of a plurality of molded flexible, plastic, square tubular members 38 which tubular member 38 are jointed to one another along their common sides 38' to form the plastic cover. Rods 39 are fitted at spaced intervals along the length of the cover into the tubes 38, and the support rollers 33 are rotatably mounted to the outer ends of each of the rods 39 to rotatably support the cover on the horizontal flanges 27 and 28 at intervals along the length of the cover and on the spiral ridges The tubular members 38 at spaced intervals have openings 38" along the bottoms to enable the top panel 38"" of each tubular element to flex and bends relative to one another, so that the cover can be readily rolled in the spiral canisters of the device.

The front plate 30 also has guide alignment rollers 40 and 40' mounted at the opposite lateral sides of the front plate 30 ahead of the sealing rollers 31 and 32. The guide alignment rollers 40 and 40' act to keep the cover 24 in alignment between the canisters and strips as it travels to open and close.

The rigid plate-30 at the forward end of the cover has a C shaped rear end 41 to receive the forward end 24'" of the plastic cover therein. When the cover is fully closed, the rubber or resilient panel 37 rests against the underside of the overhang 34, as shown in FIG. 2, white the top of the C shaped portion of the cover 24 is horizontally beside the overhang 34, so as be at the same horizontal level as the fixed overhang 34.

The overhang 34 is a horizontal panel which lies over the storage area where the cover is wound on the spiral ridges when stored. The cover 24 is also positioned, when on the straight rails 27 and 28, with its top surface substantially at the same height at the overhang 34. Consequently, there is substantially no obstruction along top of the cover or forward of the cover 24 which might prevent water accumulating on the top surface of the cover 24 and prevent water from moving or draining or gravitating forward off the front of the cover or that would cause water or snow to accumulate on the front portions of the cover.

The side strips 25 and 26 are fixed to the top side walls of the truck box and have laterally extending overhanging flanges 25' and 26' with rubber seals on the overhanging flanges which over hang the lateral sides of the cover to seal the sides of the cover when the cover is resting on the rails 27 and 28 when fully closed. The strips 25 and 26 are mounted on opposite lateral sides of the box of a pick up truck.

The front pair of lateral rollers 40 and 40' are rotatably mounted about an angular axis 42 to the lateral plate to enable the rollers 40 and 40' to roll and engage against the vertical sides 43 and 43' of the spiral mechanisms 23 and 23' to keep the front end of the cover in straight perpendicular alignment as it moves forward and rearward.

A rectangular plate 45 is fixed to the bottom of the lateral plate and extends downward between the canisters 23 and 23' to provide strength to the front of the cover for easier operation. The rubber panel 37 serves as a sealing cushion against the overhang flange having forward and rearward depending resilient flanges 46 and 46'which hook into the sides of a lateral rigid projecting portion 47 of the lateral plate to secure the rubber panel to the lateral plate 30. The panel 37 may also bulge upward in the middle away from the portion 47 to provide an added cushion effect by creating a pocket of air between them.

Thus, it will be seen that a novel sealing mechanism has been provided for effectively sealing the front edge of a flexible roll top cover to the front edge of the overhang on the device to prevent fluids and other elements from leaking between the front plate of the cover and the rear edge of the overhang on the truck box when the cover is fully closed.

It will be obvious that various changes and departures may be made to the invention without departing from the spirit and scope thereof, and accordingly, it is not intended that the invention be limited to that specifically described in the specification or as illustrated in the drawings but only as set forth in the appended claims wherein:

What is claimed is:

1. In a roll type closing truck box cover device for mounting across the top of a truck box having a front wall and opposing side walls, said cover device comprising a flexible cover with front and rear edges and side edges, said cover having side rollers mounted along its opposing side edges for traveling along the side walls of the truck box, a pair of spiral ridges on each side of the flexible cover adjacent the forward wall of the truck box and portions of the side walls of the truck box, said pair of spiral ridges each having upper and lower edges with spiraling connecting ridge portions there between, said cover being adapted to be rolled forward into the spiral ridges, for opening the truck box, gradually into a spiral shape by sliding downward along the spiral ridges;

sealing mechanism comprising a lateral overhanging flange for mounting over the top of the front wall of the box, a lateral plate mounted to the front edge of said cover with sealing rollers mounted to the lateral outer edges of said plate, a pair of cams mounted to the upper edges of the spiral ridges in the path of said sealing rollers, said sealing rollers mounted to opposite lateral edges of said front lateral plate of the cover in the path of said spiral ridges and in the path of said cams, with said side rollers of said cover being mounted in the path of said spiral ridges and beside the path of said sealing rollers and cams;

whereby said cover may be rolled open into a spiral shape at the front end of the box by the side edges of the cover following the path of the spiral ridges and said cover may be unrolled gradually out of said spiral ridges and straightened over the top and along the sides of the box to close the cover, said sealing rollers being spaced laterally outward in the path of said cams, whereby the sealing rollers on said front plate of said cover in the path of said cams engage said cams on said spiral ridges to cam said front plate and said front end of said cover sharply upward flush against said overhanging flange at the front wall of said box to seal said front end of said cover to the overhanging flange at the front of said truck box in at least substantially watertight relation to one another.

2. In a roll truck box closing device for mounting across the top of a truck box having a front wall and opposing side walls and wherein said truck box closing devise has a flexible rectangular cover with a front edge and opposing side edges, a pair of spiraling ridges on each side of the cover, said spiraling ridges having upper and lower ridge portions, said cover being adapted to move and spiral gradually downward into said spiral ridges to open said top of said truck box;

a sealing device comprising an overhanging flange at the front wall along its upper edge, a lateral panel across the front edge of said cover, said front panel having supporting means to support the cover and enable the forward end of the cover to move along spiral ridges;

cam means mounted on said upper ends of said spiral ridges in the path of the cover supporting means for said supporting means to engage and cam the front edge of the cover abruptly upward flush against the overhanging flange, when closing said cover, to seal the front edge of the cover to the overhanging flange in at least substantially watertight relation to one another.

3. In a roll top truck box cover device for mounting across the top of a truck box having a front wall and opposing sides walls and wherein the trunk box cover device has a flexible rectangular cover with a front portion and opposing side portions;

a sealing apparatus comprising an over hanging flange for mounting to the top of a the front wall of the truck box and extending rearward, rails extending rearward from said overhanging flange, a cover winding and unwinding means beneath said overhanging flange enabling the cover to wind forward in a gradual spiral beneath said overhanging flange and from said rails when opening the cover over the box and unwind rearward out from beneath said overhanging flange in a gradual spiral onto said rails when closing the cover;

cam means adjacent the cover winding and unwinding means and beneath the overhanging flange to cam the forward portion of the cover abruptly upward against the overhanging flange when the cover is unwinding onto the rails and is nearly unwound from winding and unwinding means onto the rails and said forward eltl of said panel is beneath said overhanging flange, with said cam action acting to move said forward end abruptly upward to seal the forward end of the cover to the overhanging flange.

4. A sealing apparatus according to claim 3 wherein said cover has a lateral panel means at it forward end, said lateral panel means of said cover having supporting means to support the forward end of the cover and panel and guide the cover off the rails onto its winding and unwinding means for winding the cover beneath the overhanging flange when opening the cover and unwinding the cover rearward onto the rails when closing the cover over the top of the truck box, said cover when on said rails having its top surfaces substantially horizontal with the top surfaces of the overhanging flange to prevent any obstruction in height between the cover and overhanging flange.

* * * * *